United States Patent
Petersmann

[11] Patent Number: 5,207,123
[45] Date of Patent: May 4, 1993

[54] ELECTROHYDRAULIC CONTROL FOR AN AUTOMATIC TRANSMISSION

[75] Inventor: Joseph Petersmann, Wimsheim, Fed. Rep. of Germany

[73] Assignee: Dr. Ing. h.c.F. Porsche AG, Fed. Rep. of Germany

[21] Appl. No.: 834,108

[22] Filed: Feb. 13, 1992

[30] Foreign Application Priority Data

Feb. 13, 1991 [DE] Fed. Rep. of Germany ....... 4104490

[51] Int. Cl.[5] ............................................. F16H 59/00
[52] U.S. Cl. .................................... 74/866; 192/3.58; 192/12 B; 192/12 C; 475/285; 475/292; 475/312
[58] Field of Search ................ 192/3.58, 12 B, 12 C; 475/285, 289, 292, 312, 324; 74/335, 866

[56] References Cited

U.S. PATENT DOCUMENTS

| | | | |
|---|---|---|---|
| 4,476,970 | 10/1984 | Ito | 192/3.58 X |
| 4,784,020 | 11/1988 | Hamano et al. | 192/3.58 X |
| 5,078,663 | 1/1992 | Meffert | 475/289 X |
| 5,090,952 | 2/1992 | Asada | 475/285 X |

FOREIGN PATENT DOCUMENTS 3934674  5/1990  Fed. Rep. of Germany .

2-304248  12/1990  Japan .................................. 475/285

OTHER PUBLICATIONS

Publication 4 HP 22E of the 2F Getriebe GmbH Sarrbrücken, pp. 4/3–4/10. (Jun. 1983).
Entwicklung des Viergang-Automatikgetriebes 4 HP 22 der ZF pp. 393–394, 397–398, (Jun. 1983).
Einsatz des Viergang-Automatikgetriebes 4 HP 22 mit elektronisch-hydraulischer Steuerung, pp. 401, 403, 405, (Jun. 1983).

*Primary Examiner*—Allan D. Herrmann
*Assistant Examiner*—William O. Trousdell
*Attorney, Agent, or Firm*—Evenson, McKeown, Edwards & Lenahan

[57] ABSTRACT

The invention relates to an electrohydraulic control for an automatic transmission of a motor vehicle. In order to be able to utilize, in the coasting operation of the motor vehicle in the driving position D of the automatic transmission, also the first gear, a one-way clutch, which transmits only driving torques but is required for the shifting operation, when the first gear is engaged, is bridged by a brake so that the transmission can transmit not only driving but also coasting torques and can therefore transmit the engine braking torque.

10 Claims, 4 Drawing Sheets

|  | 5a | 5b | 5c | 6 | 7 | 8 | 9 | 10 | 13 | 14 |
|---|---|---|---|---|---|---|---|---|---|---|
| P = |  | * |  |  |  |  |  |  | * |  |
| R = R- |  |  |  |  | * |  |  |  | * |  |
| N = |  | * |  |  |  |  |  | * | * |  |
| D, 1. |  | * |  |  |  |  |  | * | * |  |
| D, 2. | * |  |  | * |  |  |  |  | * |  |
| D, 3. +WK | * |  |  | * |  | * | * |  | * |  |
| D, 4. +WK |  |  |  | * | * |  | * |  | * |  |
| 1, 1. |  | * |  | * | * |  | * | * | * |  |

ELECTROHYDRAULIC CONTROL FOR AN AUTOMATIC TRANSMISSION

BACKGROUND AND SUMMARY OF THE INVENTION

The present invention relates to an electrohydraulic control for an automatic transmission of a motor vehicle having a selector lever, with selected gear positions P, N, D, 3, 2, and 1, transmitted to an electric control unit and which is mechanically connected with a hydraulic shift slide with which several shift valves are connected which are used for the hydraulic control of the automatic transmission. The control unit controls solenoid valves which shift the individual transmission gears together with one-way clutches as well as clutches and brakes which can be acted upon by pressure.

From the German Publication DE-Z ATZ 85 (1983) 6, Pages 393 to 398 and 401 to 405, a 4-speed automatic transmission is known from two publications which comprises a Simpson-type system with a rear-mounted overdrive and an electrohydraulic control. A wiring diagram for the electrohydraulic control is illustrated in Publication 4 HP 22 E of the ZF Getriebe GmbH Saarbrücken. By means of this control, in the driving position D and the shifted first gear, the engine torque is transmitted to the transmission output shaft by way of a one-way clutch. In the coasting operation, the one-way clutch is overridden so that the vehicle rolls freely and the braking torque of the engine cannot be transmitted.

For this control and other previously known controls, it is customary to carry out the downshifting into the first gear in the driving position D at approximately 10 to 30 km/h. The hydrodynamic converter of the automatic transmission makes it possible in the normal driving operation to start in the second gear so that the first gear must be used only in extreme situations.

However, a new electrohydraulic transmission control makes it possible, for power shift transmissions, to manually provide a certain gear so that it would now be possible in the driving position D, to engage the first gear below approximately 75 km/h. But the brake boosting by the engine, which is absent in contrast to the manual shift gear, would force the driver to use the service brake in order to adapt his speed to the existing traffic situation. For this reason, such a shifting operation from the second into the first gear is currently not possible by means of an automatic transmission of a conventional construction.

The German Patent Document DE-39 34 674 A1 shows an electrohydraulic control device for an automatic transmission in which a clutch which, when the first gear is engaged, establishes the power flux in the coasting operation. This clutch is not connected mechanically by means of the selector lever but is temporarily connected by the control unit by way of electromagnetic valves. Conditions for the connecting of the clutch are not disclosed in that document.

An object of the invention is to provide an electrohydraulic control for this type of an automatic transmission in which in the D position of the selecting slide, in the first gear, a transmitting of the coasting torque to the engine becomes possible by way of the transmission. In other words, a coasting connection of the engine without any significant additional costs.

This and other objects are achieved by the present invention which provides an arrangement for the electrohydraulic control of an automatic transmission of a motor vehicle having a selector lever, with gear positions P, N, D, 3, 2 and 1 being selected via the selector lever 2. The arrangement comprises solenoid valves which shift individual transmission gears together with one-way clutches as well as clutches and brakes which can be acted upon by pressure. An electric control unit is coupled to receive the selected gear positions from the selector lever, the control unit controlling the solenoid valves. A hydraulic shift slide is mechanically connected to the selector lever and a plurality of shift valves are connected thereto, this plurality of shift valves hydraulically controlling the automatic transmission. A first one of the one-way clutches is assigned to the first gear, and a first one of the brakes is parallel to the first one-way clutch. For the shifted gear position D and a shifted first gear, the first one-way clutch is bridged by admission of pressure to the first brake.

An advantageous feature of the present invention is that the braking effect of the engine can also be utilized in the first gear in the driving position D. For this purpose, only a few simple constructive measures are required which can be carried out without significant additional expenditures. The object of the invention can also be easily implemented for existing transmissions.

In addition, in the present invention the braking effect of the engine in the first gear exists at any point in time, and the action of the vehicle can therefore be predicted by the driver.

Other objects, advantages and novel features of the present invention will become apparent from the following detailed description of the invention when considered in conjunction with the accompanying drawings.

DETAILED DESCRIPTION OF THE DRAWINGS

Figure 1:
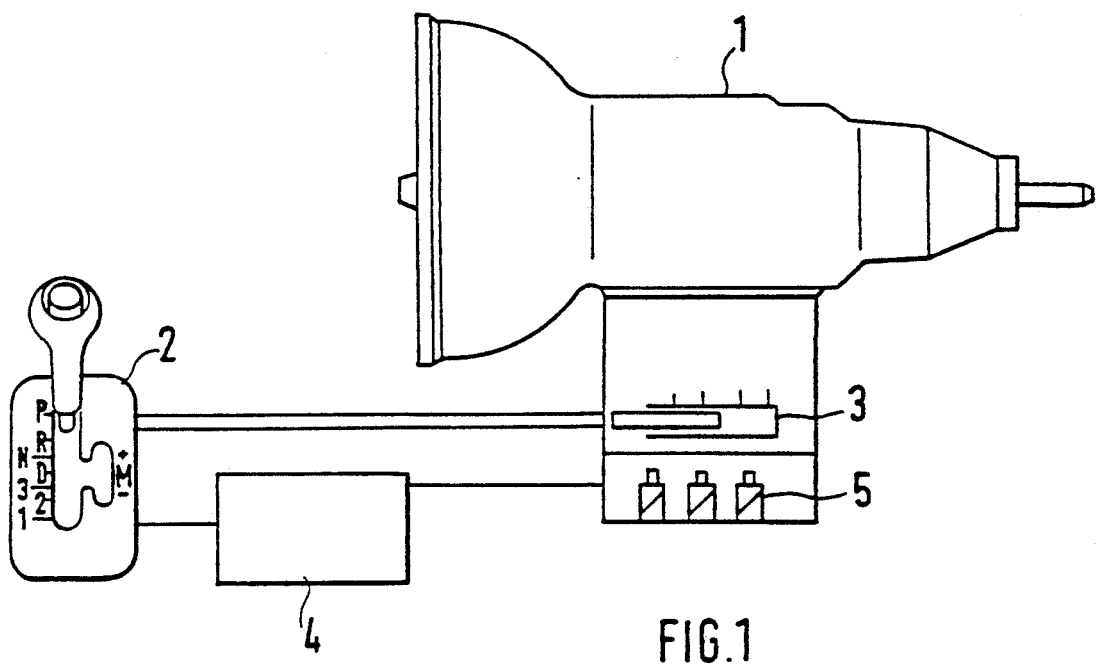
FIG. 1 is a view of a 4-speed automatic transmission.

The automatic transmission 1 according to FIG. 1 is actuated by a selector lever 2 which is mechanically connected with a hydraulic shift slide 3 of the automatic transmission 1. An electric control unit 4 detects the position of the selector lever 2 and controls solenoid valves 5 of the automatic transmission 1 according to the control table illustrated in FIG. 2.

Figures 2, 3:
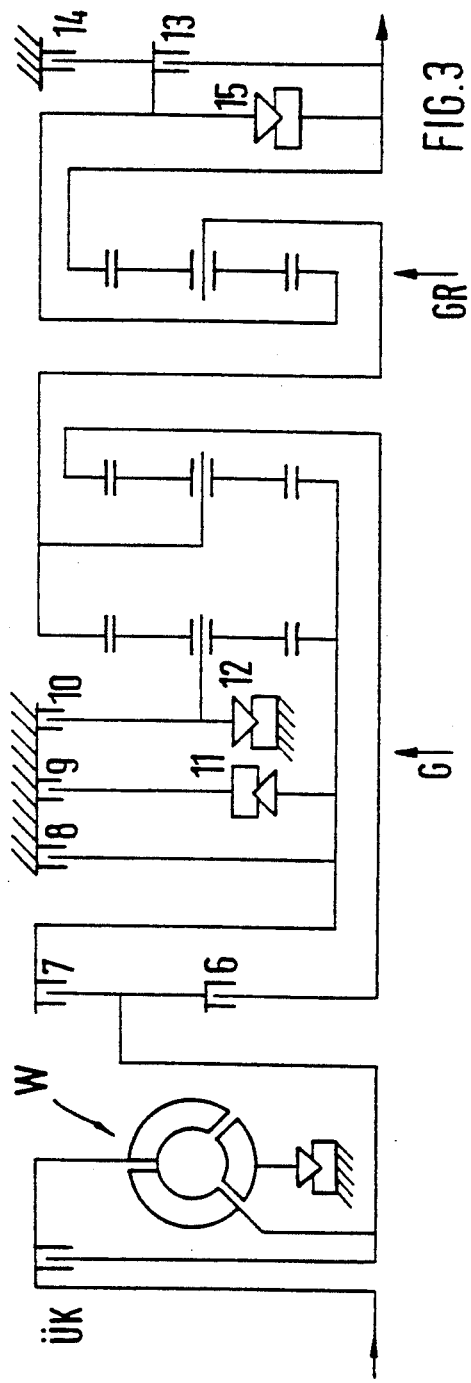
FIG. 2 is a table of the engaged clutches, brakes and solenoid valves.
FIG. 3 is a schematic diagram of the 4-speed automatic transmission according to an embodiment of the present invention.

As shown schematically in FIG. 3, the automatic transmission is driven by an engine, which is not shown, via a hydro-dynamic torque converter W with a lockup clutch ÜK. The automatic transmission comprises a basic transmission (Simpson System) G having clutches 6 and 7, brakes 8, 9 and 10, and one-way clutches 11 and 12, and an auxiliary transmission GR for the fourth gear having a clutch 13, a brake 14 and a one-way clutch 15.

From the Table according to FIG. 2, it can easily be derived which clutches and brakes 8 to 10 and 13 to 15 and solenoid valves 5 are closed or opened in the individual gears. The solenoid valves 5 are switched on and off by an electronic control unit 4 and indirectly and as a function of the position of the hydraulic shift slide 3, admit system pressure to the clutches and brakes.

Figure 4:
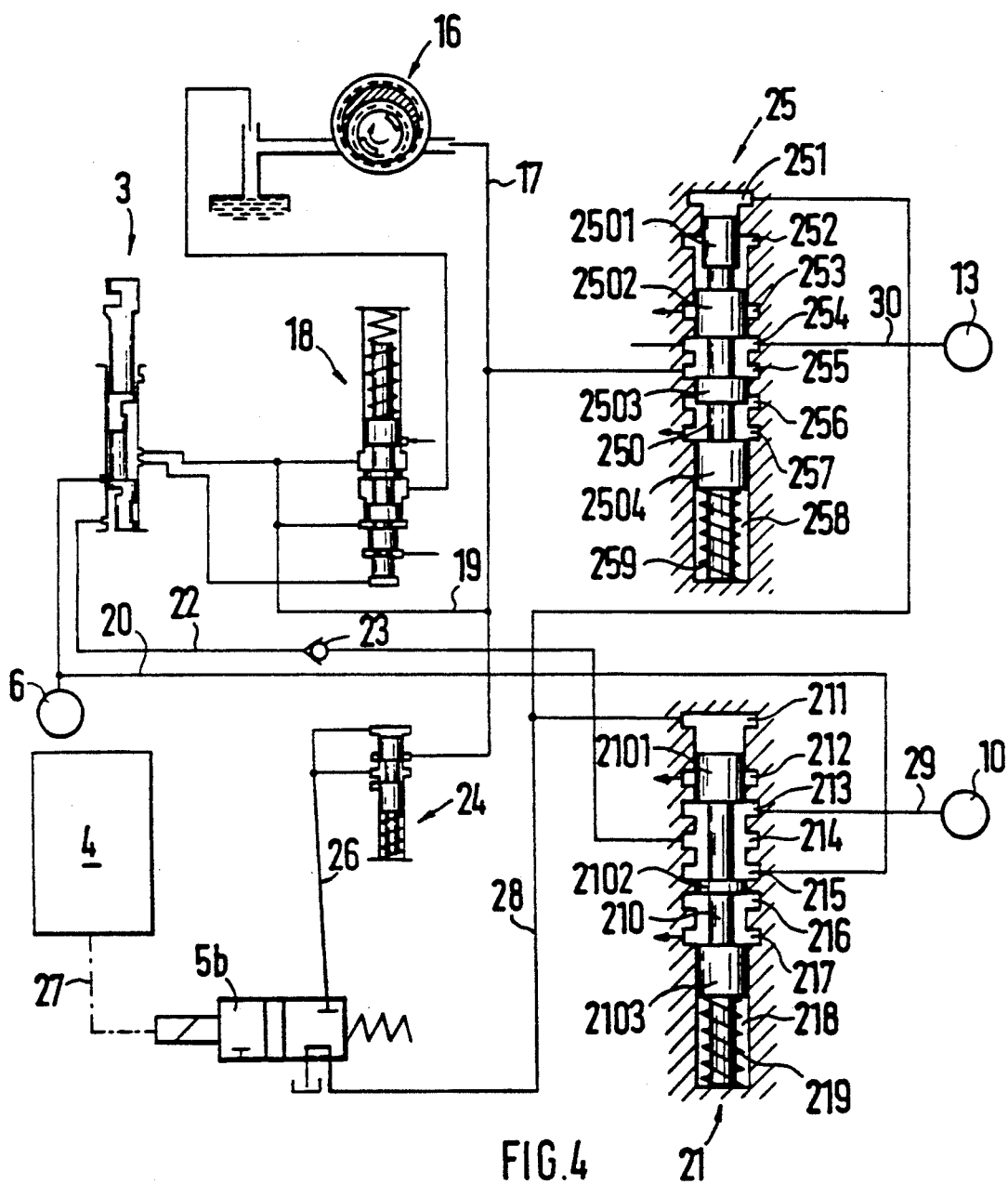
FIG. 4 is a simplified representation of a control and oil-guiding diagram for the driving position D and the shifted first gear for an embodiment of the present invention.

In the simplified representation of the control diagram according to FIG. 4, a pressure medium source 16, via a line 17, is connected with a main pressure valve 18 as well as with a system pressure duct 19 and a shift slide 3. In the shown position for the driving position D, the shift slide 3, via a line 20, establishes a connection of the system pressure duct 19 with the clutch for the forward drive 6 as well as with a fifth annulus 215 from a 1-2 shift valve 21. In addition, the shift slide 3, via a line 22 and a return valve 23, is connected with a fourth annulus 214 of the 1-2 shift valve 21, this connection being vented inside the shift slide 3. The system pressure duct 19 has a branching-off to a pressure reduction valve 24 as well as to a fifth annulus 255 of a 3-4 shift valve 25.

The solenoid valves 5 are supplied with control pressure by the pressure reduction valve 24, via a control pressure line 26. The second solenoid valve 5b is switched by the electronic control unit 4 via an electric control line 27 and is vented when it is in a not-switched condition. A hydraulic control line 28 leads from the second solenoid valve 5b to the first front-face annuli 211, 251 of the shift valves 21, 25. Both shift valves 21, 25 have several annuli 211 to 217, 251 to 257, machined into the valve housing and one piston slide valve 210, 250 respectively. Each piston slide valve 210, 250 is pressed into an end position by one pressure spring 219, 259 respectively arranged in a spring space 218, 258. The 1-2 shift valve 21 also has a pressure medium connection from the third annulus 213 via a line 29 to a reverse gear brake 10. The second annulus 212 and the seventh annulus 217 have a ventilation, and the piston slide valve 210 has three control pistons 2101, 2102, and 2103 for the formation of control edges.

The 3-4 shift valve 25 also has a pressure medium connection from the fourth annulus 254 via a line 30 to the clutch 13 for the first to the third gear and R-gear. The third and the seventh annulus 253 and 257 each have a ventilation. The piston slide valve 250, for the forming of control edges, has four control pistons 2501 to 2504. The control piston 2501, in comparison to the other control pistons, has a smaller diameter.

The electrohydraulic control device according to FIG. 4 operates as follows: During the full operation of the electrohydraulic control, in the first gear, the second solenoid valve 5b is switched on by the electronic control unit 4 so that, by way of the control line 28, the shift valves 21 and 25 are shifted against the pressure of the springs 219 and 259. In addition, the electronic system takes over the modulating pressure control and the shifting of the converter lockup clutch; both are not shown in the simplified control diagram according to FIG. 4.

Clutch 6 is closed by way of line 20, and clutch 13 is closed by way of lines 19 and 30. From line 20, the system pressure closes the brake 10 via the annuli 215, 214, and 213 as well as the line 29. At the same time, the return valve 23 is closed via the annulus 214 and the line 22, so that the pressure cannot drop.

As indicated in the transmission diagram in FIG. 3, the one-way clutch 12 situated in parallel to the brake 10 is now bridged, so that the transmission can transmit drive as well as coasting torques from the engine to the transmission output shaft and vice versa.

Figure 5:
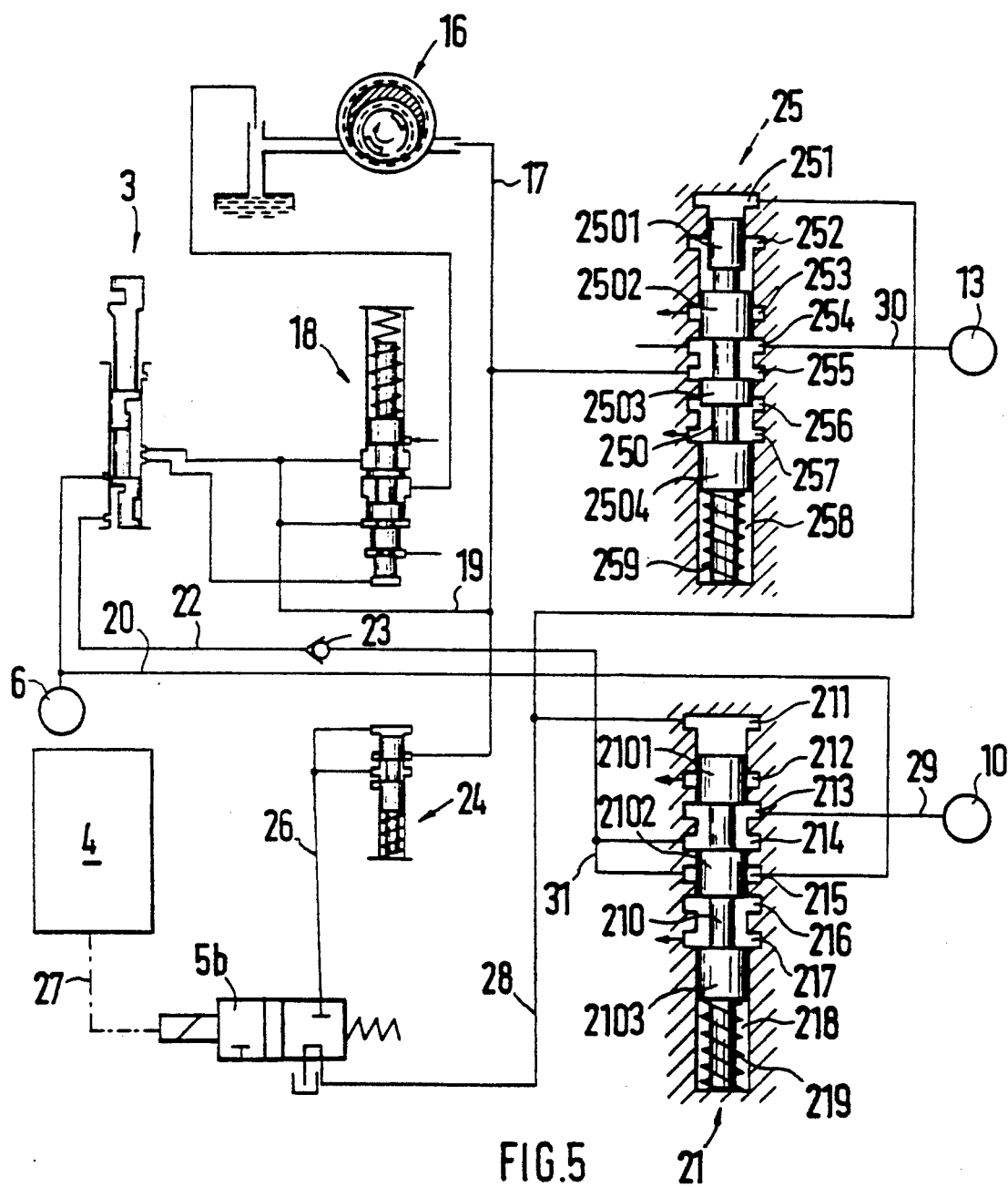
FIG. 5 is a diagram similar to FIG. 4 for a second embodiment of the present invention.

In another embodiment according to FIG. 5, the control piston 2102 closes off the annulus 215 in the shifted position. A line 31 establishes a connection between the annuli 215 and 214. From line 20, the system pressure, by way of the annulus 215, the line 31, the annuli 214 and 213 as well as the line 29, can now close the brake 10.

In another embodiment, which is not shown, the return valve 23 is replaced by a stopper.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for the electrohydraulic control of an automatic transmission of a motor vehicle having a selector lever, with gear positions P, N, D, 3, 2 and 1 being selected via the selector lever, the arrangement comprising:

solenoid valves which shift individual transmission gears together with one-way clutches as well as clutches and brakes which can be acted upon by pressure;

an electric control unit coupled to receive the selected gear positions from the selector lever, the control unit controlling said solenoid valves;

a hydraulic shift slide mechanically connected to the selector lever and with which a plurality of shift valves are connected, said plurality of shift valves hydraulically controlling the automatic transmission;

wherein a first one of said one-way clutches is assigned to the first gear, and a first one of said brakes is parallel to said first one-way clutch, and wherein for the shifted gear position D and a shifted first gear, the first one-way clutch is bridged by admission of pressure to the first brake.

2. An arrangement according to claim 1, further comprising: a shift valve connected to the first brake; first and second lines connected between the shift slide and a shift valve actuating the first brake, the first line being acted upon by pressure for the control of a first clutch, the second line being unpressurized, vented and blocked at least in the return flow direction so that the pressure cannot drop by way of this line, wherein the shift valve, in a position required for the shifting of the first gear, established a connection between the first line, the second line and, via a third line, to the first brake such that the first brake closes.

3. An arrangement according to claim 1, further comprising: a shift valve connected to the first brake; first and second lines connected between the shift slide and a shift valve actuating the first brake, the first line being acted upon by pressure for the control of a first clutch, the second line being unpressurized, vented and blocked by a blockage at least in the return flow direction so that the pressure cannot drop by way of this line, pressure of the first line being communicated to the second line by way of a connection at a point between the blockage and the shift valve, with the shift valve, in a position required for the shifting of the first gear, establishing a connection between the second line and a third line to the first brake such that the brake closes.

4. An arrangement according to claim 2, wherein the shift valve actuating the brake comprises: a cylindrical bore with annuli, a first annulus acted upon by pressure by one of said solenoid valves, a second annulus comprising a venting bore, a third annulus connected via the third line with the first brake, a fourth annulus connected with the second line, and a fifth annulus connected with the first line, and a control slide having steps and which is guided in the bore and held in an inoperative position by a spring and, when the first annulus disposed opposite the spring is acted upon by pressure, moves into an operative position such that different annuli are closed in the inoperative and in the operative positions, the steps of the control slide closing the annuli in such a manner that, in the inoperative position, the second line and the third line are jointly vented via the second annulus and, in the operative position, the second annulus is closed, and the first line, the second line and the third line are connected.

5. An arrangement according to claim 3, wherein the shift valve actuating the brake comprises: a cylindrical bore with annuli, a first annulus acted upon by pressure by one of said solenoid valves, a second annulus comprising a venting bore, a third annulus, via the third line, being connected with the brake, a fourth annulus being connected with the second line, and a fifth annulus being connected with the first line, and a control slide having steps and which is guided in the bore and held in an inoperative position by a spring and, when the first annulus disposed opposite the spring is acted upon by pressure, moves into an operative position such that different annuli are closed in the inoperative and in the operative positions, the steps of the control slide closing the annuli in such a manner that, in the inoperative position, the third line is vented via the second annulus, and, in the operative position, the second annulus is closed, and the second line and the third line are connected.

6. An arrangement according to claim 2, wherein the blockage of the second line is a return valve.

7. An arrangement according to claim 3, wherein the blockage of the second line is a return valve.

8. An arrangement according to claim 3, wherein the blockage of the second line is a stopper.

9. An arrangement according to claim 2, wherein the blockage of the second line is a stopper.

10. An arrangement according to claim 1, wherein the first brake is always actuated when the first gear is shifted.

* * * * *